US008803973B2

(12) United States Patent  
Chen

(10) Patent No.: US 8,803,973 B2  
(45) Date of Patent: Aug. 12, 2014

(54) STEREO IMAGE CAPTURING DEVICE

(75) Inventor: Ga-Lane Chen, Santa Clara, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 346 days.

(21) Appl. No.: 13/340,596

(22) Filed: Dec. 29, 2011

(65) Prior Publication Data

US 2013/0113889 A1    May 9, 2013

(30) Foreign Application Priority Data

Nov. 9, 2011    (TW) .................................. 100140822

(51) Int. Cl.  
*H04N 13/02*    (2006.01)

(52) U.S. Cl.  
USPC .......................................... 348/147; 348/350

(58) Field of Classification Search  
USPC ........... 348/47, 253, 263, 348, 349, 350, 353, 348/354, 356  
See application file for complete search history.

(56) References Cited

U.S. PATENT DOCUMENTS

| 2004/0165090 | A1* | 8/2004 | Ning ............................. 348/272 |
| 2006/0093234 | A1* | 5/2006 | Silverstein ..................... 382/255 |
| 2008/0013941 | A1* | 1/2008 | Daley ............................ 396/121 |
| 2008/0158377 | A1* | 7/2008 | Chanas et al. ............... 348/222.1 |
| 2011/0134224 | A1* | 6/2011 | McClatchie .................... 348/47 |
| 2012/0301016 | A1* | 11/2012 | Zhu et al. ...................... 382/162 |
| 2013/0041221 | A1* | 2/2013 | McDowall et al. ........... 600/111 |

* cited by examiner

*Primary Examiner* — David Harvey  
(74) *Attorney, Agent, or Firm* — Novak Druce Connolly Bove + Quigg LLP

(57) ABSTRACT

A stereo image capturing device includes two image capturing modules, an image processing unit, a memory and a processor for respectively storing and executing the image processing unit. Each image capturing module includes a liquid crystal lens, a voltage drive chip, and an image sensor. The image processing unit includes a WDF module, a focus control module, and an image synthesize module. The WDF module determines the sharpness of the colors of images, and acquires object distance of the images according to the sharpness. When the object distance is bigger than a predetermined distance, the WDF module modifies the sharpness of the images, otherwise the focus control module drives the voltage drive chip to change focal distance of the liquid crystal lens according to the object distance. The image synthesize module synthesizes the images to stereo images.

9 Claims, 3 Drawing Sheets

STEREO IMAGE CAPTURING DEVICE

TECHNICAL FIELD

The present disclosure relates to digital image capturing devices, particularly to a stereo image capturing device.

DESCRIPTION OF RELATED ART

Width Depth Field (WDF) technology has been used in digital image capturing field. By using this technology, different sharpness corresponding to different colors of the image is determined, a sharpest color is selected, and the sharpness of the other colors is modified according to the sharpness of the sharpest color. In this way, a clear image is obtained without changing the focal length of an image capturing device.

Yet, when the object distance is too small, for example, is smaller than 400 millimeters (mm), the sharpness of all colors is bad and cannot be used by WDF technology to make the image clear.

What is needed, therefore, is a stereo image capturing device which can overcome the limitations mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
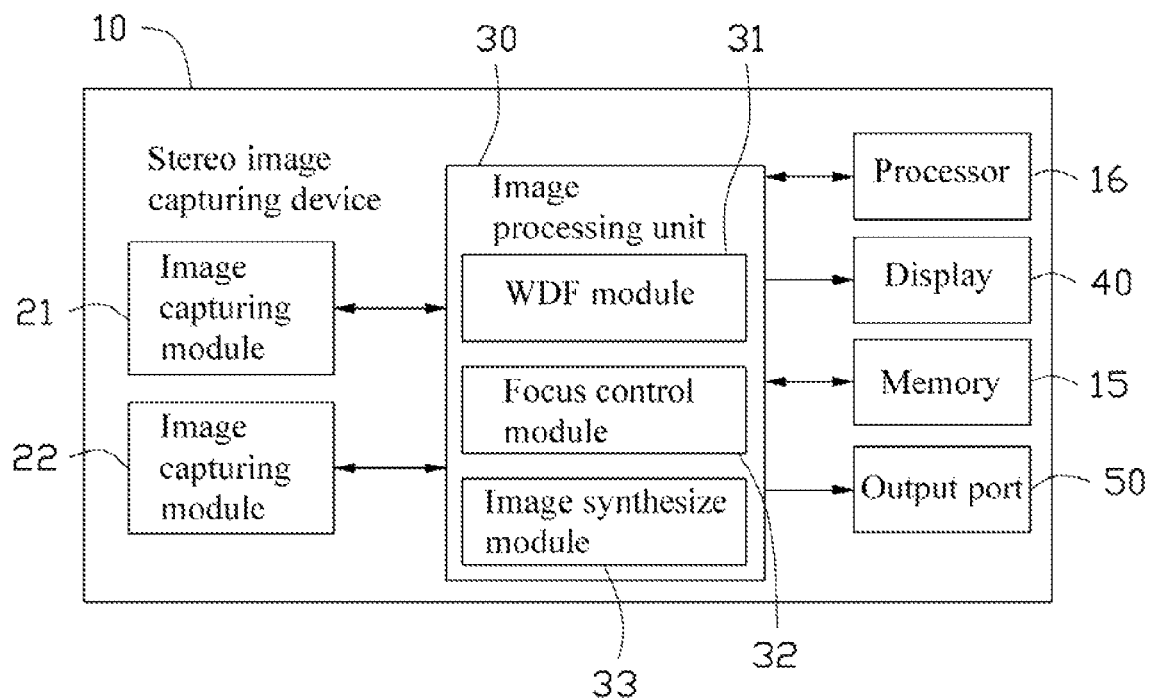
FIG. 1 is a functional diagram of a stereo image capturing device according to an embodiment, the stereo image capturing device including two image capturing modules.

FIG. 1, a stereo image capturing device 10 according to an embodiment is shown. In this embodiment, the stereo image capturing device 10 is a mobile phone. The stereo image capturing device 10 includes two image capturing modules 21, 22, an image processing unit 30, a memory 15, a processor 16, a display 40, and an output port 50. One or more computerized codes of the image processing unit 30 may be stored in the memory 15 and executed by the processor 16.

The two image capturing modules 21, 22 capture images of a same object from different viewing angles and send the captured images to the image processing unit 30. The image processing unit 30 synthesizes the images from the two image capturing devices 21, 22 to form a stereo image. For getting a good stereo image, the distance between the centers of the two image capturing devices 21, 22 is in the range of 25 mm to 40 mm, optimally equal to 32.5 mm. As the stereo image capturing/synthesizing technology is familiar to one skilled in the art, a detailed description is omitted here.

The image processing unit 30 communicates with the image capturing modules 21, 22, the display 40 and the output port 50 respectively. In this embodiment, the image processing unit 30 communicates with the image capturing modules 21, 22 via a Mobile Industry Processor Interface (MIPI).

The image processing unit 30 includes a Width Depth Field (WDF) module 31, a focus control module 32, and an image synthesizing module 33.

The WDF module 31 receives the captured images from the image capturing modules 21, 22. The captured images each have at least two colors. In this embodiment, the captured images have three colors such as a red, a green, and a blue. There is a relationship between the object distance (the distance between the object being captured and the image capturing device 10) and the sharpness of a color. The WDF module 31 determines the sharpness of the colors and acquires the object distance d according to the sharpness of a color, for example, the sharpness of the color red. The WDF module 31 then determines whether the object distance d is bigger than a predetermined distance D. In this embodiment, the predetermined distance D is about 400 mm. If the object distance d is bigger than the predetermined distance D, the WDF module 31 modifies the sharpness of the colors contained in the captured images to achieve two first clear images. The sharpness modifying method is described in a U.S. patent application Ser. No. 11/817,977, entitled Method Of Controlling An Action, Such As A Sharpness Modification, Using A Color Digital Image. The WDF module 31 sends the two first clear images to the image synthesize module 33. The image synthesize module 33 synthesizes the two first clear images to a first stereo image.

When the object distance d is equal to or smaller than the predetermined distance D, the WDF module 31 sends the value of the object distance d to the focus control module 32. The focus control module 32 drives the image capturing modules 21, 22 to focus on the object.

Figure 2:
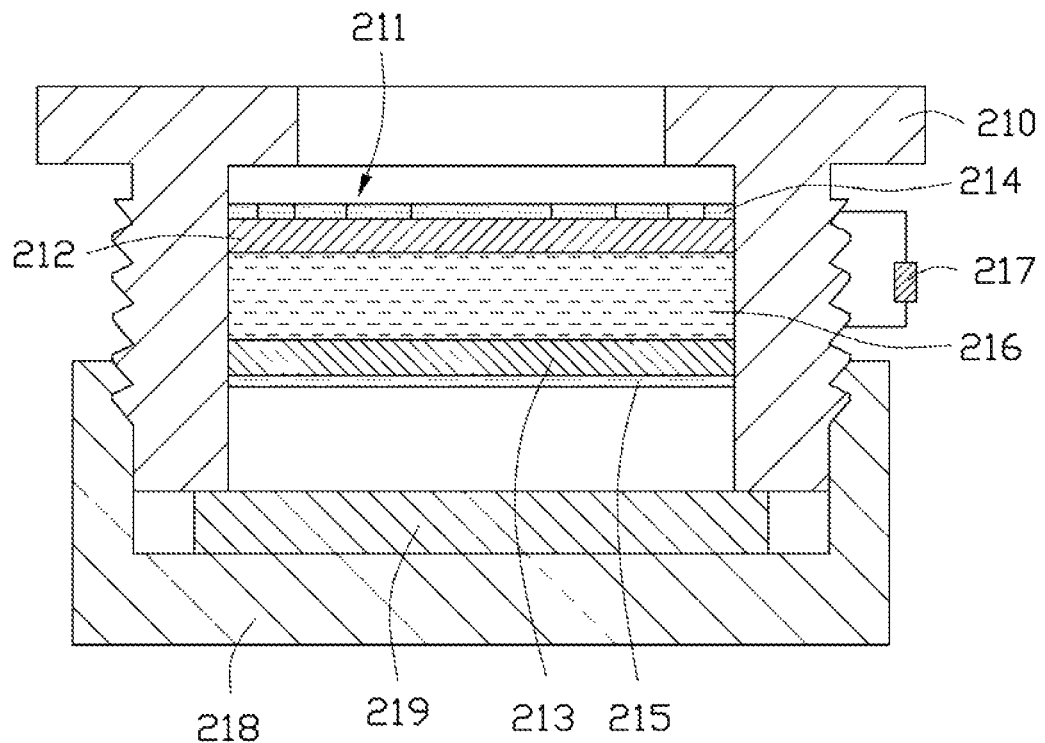
FIG. 2 is a schematic, sectional view of one of the image capturing modules of FIG. 1.

In FIG. 2, a detailed configuration of one of the image capturing modules 21, 22 is disclosed.

The image capturing module 21 includes a barrel 210 and a liquid crystal lens 211 received in the barrel 210. The liquid crystal lens 211 includes a first transparent substrate 212, a second transparent substrate 213, a first electrode layer 214, a second electrode layer 215, and a liquid crystal layer 216. The liquid crystal layer 216 is filled between the first transparent substrate 212 and the second transparent substrate 213. The first electrode layer 214 is arranged on one surface of the first transparent substrate 212 facing away from the liquid crystal layer 216. The second electrode layer 215 is arranged on one surface of the second transparent substrate 213 facing away from the liquid crystal layer 216. The image capturing module 21 further includes a voltage drive chip 217 respectively electrically connected with the first electrode layer 214 and the second electrode layer 215. The voltage drive chip 217 applies a voltage between the first and second electrode layers 214, 215, to change the deviation angle of the liquid crystal molecules in the liquid crystal layer 216, thus changing the focal distance f of the liquid crystal lens 211. There is a relationship between the applied voltage, the deviation angle of the liquid crystal molecules, and the focal distance f.

The image capturing module 21 further includes a seat 218 and an image sensor 219. The barrel 210 is mounted on the seat 218. The image sensor 219 is received in the seat 218 and is aligned with the liquid crystal lens 211.

When the focus control module 32 receives the object distance d from the WDF module 31, the focus control module 32 calculates the focal distance f according to the object distance d, and sends a corresponding control signal to the voltage drive chip 217. The voltage drive chip 217 applies a proper voltage corresponding to the focal distance f between the first and second electrode layers 214, 215 to change the focal distances of the image capturing modules 21, 22. The image capturing modules 21, 22 then can achieve two second clear images. Then the image synthesize module 33 synthesizes the two second clear images to a second stereo image.

The image synthesize module 33 sends the first or second stereo image to the display 40 and the output port 50. The display 40 shows the first or second stereo image. The first or second stereo image can be further sent to a stereo television or a computer via the output port 50. In this embodiment, the output port 50 is a High Definition Multimedia Interface (HDMI).

Figure 3:
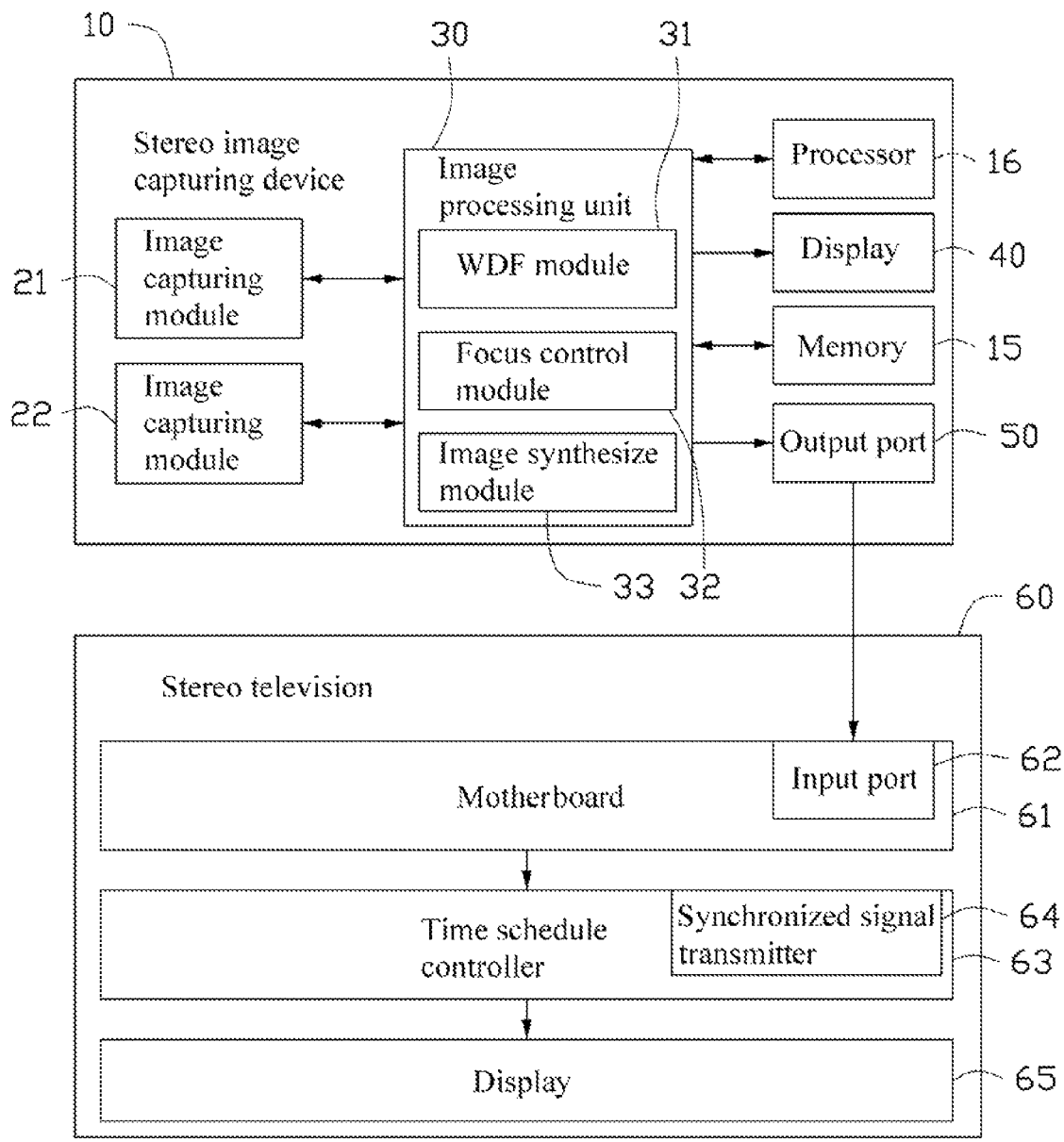
FIG. 3 is a functional diagram showing the stereo image capturing device of FIG. 1 connected to a stereo television.

Referring to FIG. 3, a stereo television 60 connected to the stereo image capturing device 10 is shown. The stereo television 60 includes a motherboard 61, a time schedule controller 63, and a display 65. The motherboard 61 includes an input port 62 communicating with the output port 50. The input port 62 is a HDMI in this embodiment. The time schedule controller 63 includes a synchronized signal transmitter 64. The motherboard 61 receives the first or second stereo image, resolves the first or second stereo image into a left eye image and a right eye image, and sends the left eye image and right eye image to the time schedule controller 63. The time schedule controller 63 sends the left eye image and the right eye image to the display 65 in series. The synchronized signal transmitter 64 sends a synchronized signal to a pair of liquid crystal glasses equipped by a user (not shown), for ensuring when the left eye image is shown on the display 65, a right eye lens of the glasses is cutoff and the user can only observe the display 65 by the left eye, and when the right eye image is shown on the display 65, a left eye lens of the glasses is cutoff and the user can only observe the display 65 by the right eye. In this way, the user observes different images by the left eye and the right eye and synthesizes the images to a stereo image in the brain.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A stereo image capturing device, comprising:
   two image capturing modules, each image capturing module comprising a liquid crystal lens, a voltage drive chip, and an image sensor, wherein the voltage drive chip is configured for applying voltage to the liquid crystal lens for changing a focal distance of the liquid crystal lens, the image sensor is configured for capturing images with at least two kinds of colors;
   a memory;
   a processor; and
   an image processing unit being stored in the memory and executable by the processor, the image processing unit comprising:
     a WDF module;
     a focus control module; and
     an image synthesize module, the WDF module configured for determining the sharpness of the colors of the images, and acquiring object distance of the images according to the sharpness; wherein
   when the object distance is bigger than a predetermined distance, the WDF module modifies the sharpness of the images to get first clear images, and when the object distance is equal to or smaller than the predetermined distance, the WDF module sends the object distance to the focus control module, the focus control module drives the voltage drive chip to change the focal distance of the liquid crystal lens according to the object distance, whereby the image sensor acquires second clear images; and wherein the image synthesize module is configured for synthesizing the first clear images to first stereo images, and synthesizing the second clear images to second stereo images.

2. The stereo image capturing device of claim 1, wherein the liquid crystal lens comprises a first transparent substrate, a second transparent substrate, a liquid crystal layer filled between the first transparent substrate and the second transparent substrate, a first electrode layer and a second electrode layer, the first electrode layer is positioned on the first transparent substrate, the second electrode layer is positioned on the second transparent substrate, the voltage drive chip is electrically connected to the first electrode layer and the second electrode layer.

3. The stereo image capturing device of claim 1, wherein the predetermined distance is 400 millimeters.

4. The stereo image capturing device of claim 1, further comprising an output port, the image synthesize module sending the first stereo images and the second stereo images to the output port.

5. The stereo image capturing device of claim 4, wherein the output port is a HDMI.

6. The stereo image capturing device of claim 5, wherein the HDMI is configured for connecting to a stereo television.

7. The stereo image capturing device of claim 1, wherein the distance between the centers of the two image capturing modules is in the range from 25 millimeters to 40 millimeters.

8. The stereo image capturing device of claim 7, wherein the distance between the centers of the two image capturing modules is 32.5 millimeters.

9. The stereo image capturing device of claim 1, wherein each the image capturing module further comprises a barrel and a seat, the barrel is mounted on the seat, the liquid crystal lens is received in the barrel, the image sensor is received in the seat and aligned with the liquid crystal lens.

\* \* \* \* \*